United States Patent
Schliwa

(10) Patent No.: US 9,016,626 B2
(45) Date of Patent: Apr. 28, 2015

(54) CONVERTIBLE MONUMENTS

(75) Inventor: Ralf Schliwa, Dollern (DE)

(73) Assignee: Airbus Operations GmbH, Hamburg (DE)

( * ) Notice: Subject to any disclaimer, the term of this patent is extended or adjusted under 35 U.S.C. 154(b) by 83 days.

(21) Appl. No.: 13/244,437

(22) Filed: Sep. 24, 2011

(65) Prior Publication Data

US 2012/0248245 A1 Oct. 4, 2012

Related U.S. Application Data

(63) Continuation of application No. PCT/EP2010/052934, filed on Mar. 9, 2010.

(60) Provisional application No. 61/162,791, filed on Mar. 24, 2009.

(30) Foreign Application Priority Data

Mar. 24, 2009 (DE) .......................... 10 2009 014 598

(51) Int. Cl.
  *B64D 11/00* (2006.01)
  *B64D 11/04* (2006.01)
  *B61D 35/00* (2006.01)
  (Continued)

(52) U.S. Cl.
  CPC ............... *B64D 11/04* (2013.01); *B61D 35/00* (2013.01); *B61D 37/00* (2013.01); *B61D 37/006* (2013.01); *B64D 11/003* (2013.01); *B64D 11/02* (2013.01); *B64D 2011/0046* (2013.01); *Y02T 50/46* (2013.01)

(58) Field of Classification Search
  USPC ....................................... 244/118.5, 120, 119
  See application file for complete search history.

(56) References Cited

U.S. PATENT DOCUMENTS 5,083,727 A * 1/1992 Pompei et al. ............. 244/118.6
5,784,836 A * 7/1998 Ehrick ........................... 52/79.8
(Continued)

FOREIGN PATENT DOCUMENTS

DE        10164068 A1    4/2003
DE    102005043610 A1    3/2007
(Continued)

OTHER PUBLICATIONS

German Office Action dated Mar. 1, 2010 for German Application No. 102009014598.2.
(Continued)

*Primary Examiner* — Tien Dinh
*Assistant Examiner* — Vicente Rodriguez
(74) *Attorney, Agent, or Firm* — Ingrassia Fisher & Lorenz, P.C.

(57) ABSTRACT

A monument is provided for a cabin of transportation, for example a lavatory monument, a kitchen or galley monument or a storage monument to be fitted in an aircraft, in a helicopter, in a ship or boat, in a train or in a caravan or trailer. A mounting system is also provided with one or several monuments and transportation with a monument installed therein. The monument for the cabin of the transportation includes, but is not limited to a flexible attachment element for attaching the monument to the cabin of the transportation means. The flexible attachment element is designed in such a manner that attachment of the monument can take place in a region of relative positions of the monument relative to the cabin of the transportation.

9 Claims, 13 Drawing Sheets

(51) Int. Cl.
*B61D 37/00* (2006.01)
*B64D 11/02* (2006.01)

(56) References Cited

U.S. PATENT DOCUMENTS

| | | | | |
|---|---|---|---|---|
| 6,101,766 | A * | 8/2000 | Mogensen | 52/34 |
| 6,412,603 | B1 | 7/2002 | Nervig et al. | |
| 7,913,950 | B2 * | 3/2011 | Huber | 244/118.1 |
| 7,922,119 | B2 * | 4/2011 | Muin et al. | 244/118.5 |
| 7,984,874 | B2 | 7/2011 | Diergardt | |
| 8,070,097 | B2 * | 12/2011 | Veckenstedt et al. | 244/118.5 |
| 8,087,611 | B2 * | 1/2012 | Arnold et al. | 244/118.1 |
| 8,403,266 | B2 * | 3/2013 | Fokken et al. | 244/131 |
| 2007/0102579 | A1 | 5/2007 | Krieglsteiner et al. | |
| 2007/0262212 | A1 | 11/2007 | White | |
| 2008/0078872 | A1 | 4/2008 | Schalla et al. | |
| 2009/0283636 | A1 | 11/2009 | Saint-Jalmes et al. | |
| 2010/0155530 | A1 * | 6/2010 | Tsirangelos et al. | 244/118.5 |
| 2010/0206985 | A1 * | 8/2010 | Rahlff | 244/118.5 |

FOREIGN PATENT DOCUMENTS

| | | |
|---|---|---|
| DE | 102006048998 A1 | 7/2007 |
| DE | 102007003802 A1 | 8/2008 |
| DE | 102007029677 A1 | 1/2009 |
| DE | 102009014598 A1 | 9/2010 |
| EP | 1174340 A2 | 1/2002 |
| EP | 1803645 A1 | 7/2007 |
| WO | 2007073938 A1 | 7/2007 |

OTHER PUBLICATIONS

International Search Report dated Dec. 22, 2010 for International Application No. PCT/EP2010/052934.
International Preliminary Report on Patentability dated Sep. 27, 2001 for International Application No. PCT/EP2010/052934.

* cited by examiner

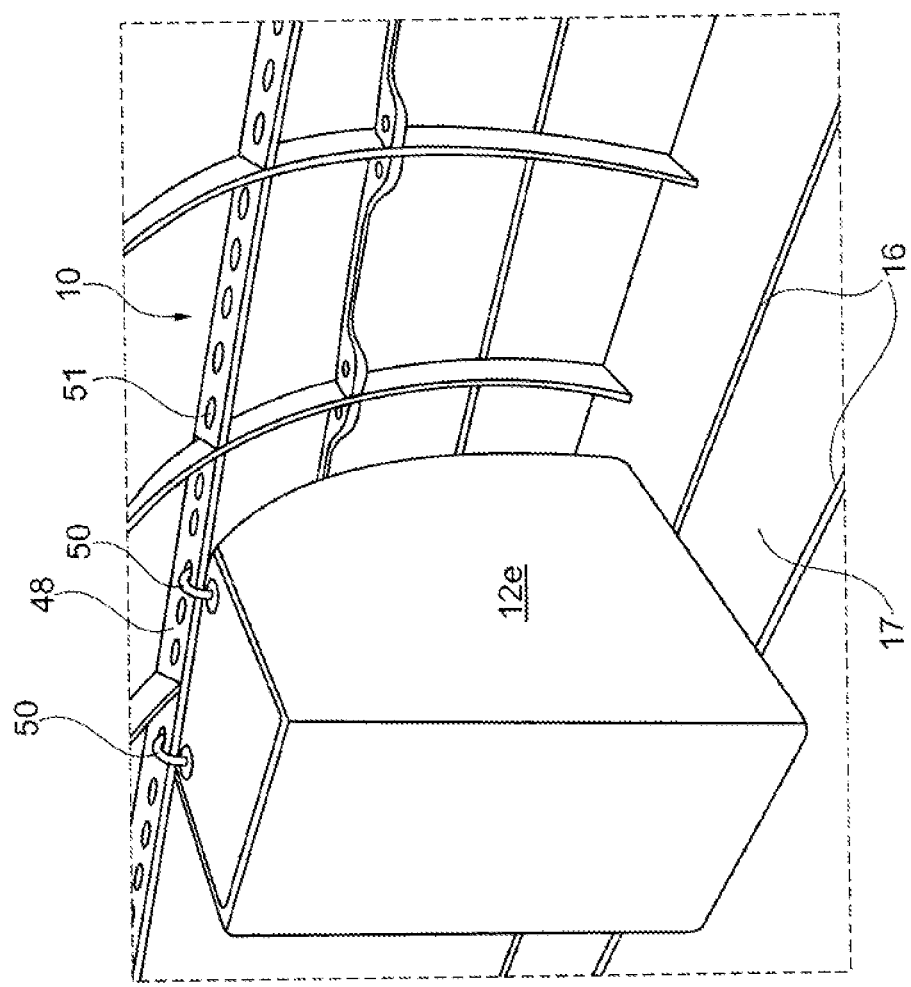

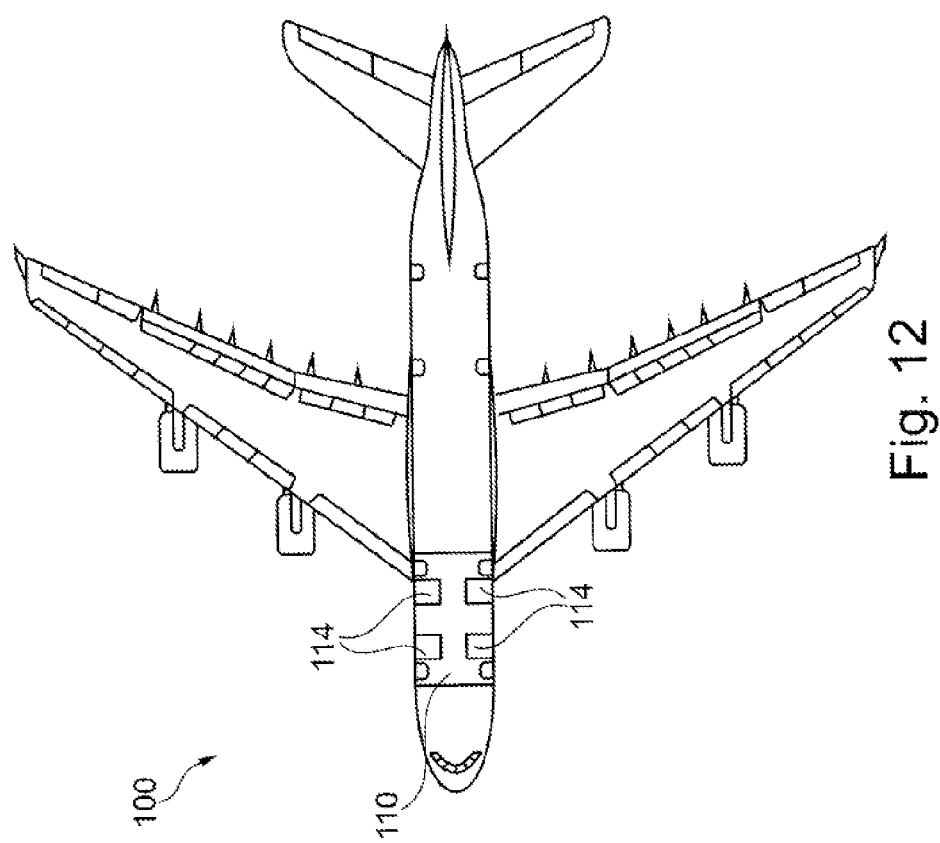

CONVERTIBLE MONUMENTS

CROSS-REFERENCE TO RELATED APPLICATION

This application is a continuation of International Application No. PCT/EP2010/052934, filed Mar. 9, 2010, which was published under PCT Article 21(2) and which claims priority to German Patent Application No. 102009014598.2 filed Mar. 24, 2009 and of U.S. Provisional Patent Application No. 61/162,791 filed Mar. 24, 2009, the disclosure of which applications is hereby incorporated herein by reference.

TECHNICAL FIELD

The technical field relates to the configuration of cabins of transportation means. In particular, the technical field relates to a monument for a cabin of a transportation means, for example a lavatory monument, a kitchen or galley monument or a storage monument to be fitted in an aircraft, in a helicopter, in a ship or boat, in a train or in a caravan or trailer. Apart from this the technical field relates to a mounting system with one or several monuments, and to transportation means with a monument installed therein.

BACKGROUND

In transportation means, for example in aircraft, such monuments can be attached to so-called hard points. A hard point is an attachment point created for a particular monument, which attachment point can be a hole in a structural element of the transportation means. For various monuments, for example a kitchen element and a lavatory monument, these hard points can comprise different diameters or can be provided for accommodating different attachment means, for example screws or clamps. To provide a bearing arrangement for the forces which a monument exerts on its hard points it may be necessary to provide support elements in the transportation means. Furthermore, it may be necessary to provide a hole in base plates of the cabin of the transportation means in order to gain access to the hard points. Thus already in the concept stage of the transportation means consideration must be given to the position at which a particular monument is to be installed.

In particular in the case of aircraft, attachment of the monuments to the aircraft fuselage is not standardized, but specifically attuned to the integration of the particular monument in the aircraft. For example, attachment of monuments differs from attachment of hatracks.

Likewise, the connections of monuments to on-board systems, for example electrical power, service water and waste water, are not standardized. The cables and pipes to the connections are specially laid to the positioning space of a monument. In order to make it possible to seamlessly join the monuments to a lateral lining, gaps between the lateral lining and a monument are filled in by means of trimming parts. This frequently results in a large number of trimming parts.

Generally speaking, the installation of monuments in a transportation means causes significant adaptation expenditure in the cabin of the transportation means. Likewise, quick reconfiguration of the transportation means between two journeys or flights becomes almost impossible. DE 10 2005 043 610 A1 and US 2007 102579 A1 describe a monument for an aircraft. The monument comprises attachment elements for attaching the monument to corresponding attachment elements of an aircraft surface in an aircraft at a predetermined position.

It is at least one object to reduce the installation time or reconfiguration time of a transportation means and in addition to save weight in the transportation means. In addition, other objects, desirable features and characteristics will become apparent from the subsequent summary and detailed description, and the appended claims, taken in conjunction with the accompanying drawings and this background.

SUMMARY

According to an exemplary embodiment, a monument for a cabin of a transportation means comprises a flexible attachment element for attaching the monument to the cabin or to a supporting structure of the fuselage of the transportation means. The flexible attachment element is designed in such a manner that attachment of the monument can take place in a region of relative positions of the monument relative to the cabin of the transportation means.

By making flexible at least one attachment element of the monument and by standardizing attachment positions or attachment points of the transportation means, the adaptation effort is displaced from the cabin of the transportation means to the monument. Apart from this, the adaptation effort is reduced in that the flexible attachment means can be adapted with little effort to the attachment location of the monument in the transportation means.

The flexible attachment element makes it possible to attach the monument within a region of relative positions within the cabin of the transportation means without this requiring significant change in the cabin. There is no longer any adaptation effort which otherwise arises in that the cabin needs to be adapted to the monument to be accommodated. Moreover it is no longer necessary for every relative position at which a monument can be provided in a cabin to provide attachment points and the load-bearing connections that are necessary for this. These separate attachment points and load-bearing connections can be done without and consequently weight savings in the transportation means can be achieved.

According to one embodiment, in the case of aircraft or ships or boats, the flexible attachment element is attached to frame elements or beams of the fuselage of the aircraft or of the hull of the ship or boat. Apart from at least one flexible attachment element a multitude of flexible attachment elements is also possible, which flexible attachment elements can be attached to the monument or integrated in the monument.

According to one embodiment, the attachment element can be connected to an attachment rail for a hatrack. The hatrack can, for example, be an overhead rack, for example a baggage rack. An attachment rail for hatracks is, as a rule, already present in each cabin of the transportation means, and consequently there is no need to provide separate attachment positions for the monument.

According to one embodiment, the attachment element can be connected to a seat rail of the transportation means. In cabins of transportation means, seat rails are frequently already present, by means of which seat rails seats or seat rows for passengers can be attached to the floor or to the floor beam structure of the transportation means. By attaching the monument to the seat rails there is no need to provide separate special attachment positions for the monument.

According to one embodiment the monument comprises lower, possibly flexible, attachment elements for attaching the monument to a floor beam structure in the floor of the cabin.

According to one embodiment the monument comprises upper, possibly flexible, attachment elements for attachment to a lateral support structure or roof beam structure of the cabin.

According to one embodiment the monument can be attached with several attachment elements in the cabin of the transportation means; for example with an upper attachment element to an attachment rail for a hatrack and with a lower attachment element to a seat rail. By providing several flexible attachment elements, flexible positioning of the monument during installation of the monument can be carried out without the attachment of the monument on the transportation means being less strong than the attachment of a conventional monument.

According to a further embodiment, the flexible attachment element comprises an attachment rail. This attachment rail can, for example, be attached to the top of the monument and after installation can possibly extend parallel to the longitudinal axis of the transportation means. In the attachment rail one or several clamps can be arranged that are slidable within the attachment rail. When the monument during installation is at the target position the clip can be slid to that position within the attachment rail, at which position it can be connected to the cabin by means of a non-flexible attachment position of the means of transport.

According to one embodiment the monument further comprises attachment elements for attaching the monument to a floor of the cabin and a load-distributing substructure. The load-distributing substructure is suitable for evenly distributing the forces which the monument exerts on the attachment elements and on the floor. In this manner the monument can be arranged or erected at various positions within the cabin without the floor region being subjected to the load of the monument first having to be specially prepared for the monument.

According to one embodiment the load-distributing substructure comprises a base plate that for the purpose of distributing the load can comprise a base area that is larger than that of the monument.

According to one embodiment the monument comprises a trolley, an accommodation region for the trolley. The trolley can be driven into and out of the accommodation region. The base plate comprises a wedge-shaped section that serves as a ramp for the trolley in the accommodation region. In such a monument, in the case of a kitchen monument or a galley, the use of one or several trolleys can be assumed. By means of the ramp a base plate of a thickness can be selected which without the ramp would impede the trolley or trolleys from being driven in and out, which base plate, however, as a result of its thickness optimally distributes the load.

According to one embodiment the monument comprises at least one supply connection for connecting the monument to at least one on-board system of the transportation means. The supply connection comprises a monument-connection end that can be connected to a transportation-means connection end of the on-board system. The monument-connection end is movable relative to the monument.

During installation of the monument the transportation-means connection end need not be specially adapted to the position of the monument, in that, for example, lines or pipes are installed; instead, the monument-connection end is merely moved to the transportation-means connection end and is connected to the aforesaid. In this arrangement the monument can be connected to a host of different on-board systems, for example to a power supply system, a service water system, a waste water system or to a data network (in which the connection can, for example, take place by means of glass fibers). This is thus a "flexible" supply connection. Moreover, it is possible for several connections for various on-board systems to be integrated in a standard connection.

In one embodiment the monument-connection end can be moved in horizontal direction, or in the case of an installed monument in the direction of the longitudinal axis of the transportation means.

According to one embodiment a monument for a transportation means is provided, which monument comprises at least one connection element for connecting the monument to the transportation means, wherein the at least one connection element can be moved relative to the monument. The connection element can, for example, be a clamp for a rail or a connection end for an on-board system of the transportation means.

According to one embodiment the monument-connection end can be connected to the transportation-means connection end that is suitable for connection to a hatrack-connection end. In the case of transportation-means connection ends standardized in this manner there is no need to provide separate connection ends for monuments and hatracks.

According to one embodiment the supply connection of the monument is arranged laterally on the rear wall, in other words the wall that faces, or that is to face, the outside wall of the transportation means.

According to a further embodiment the monument comprises an induction loop by means of which, by way of an induction loop of the transportation means, the monument can be supplied with power. For example, underneath the floor of the cabin of the transportation means a chain of induction loops can be arranged, which are also suitable for supplying power to seats attached in the transportation means.

A mounting system is also provided for installation in a transportation means, which mounting system comprises a monument according to the described embodiments. According to one embodiment the mounting system comprises at least two hatracks whose extensions in longitudinal direction of the transportation means differ from one another. The two hatracks differ in length. According to one embodiment the mounting system comprises a hatrack whose extension in longitudinal direction of the transportation means is adjustable. The length of the hatracks can be varied.

During concurrent installation of hatracks and monuments in the cabin a problem can arise in that a gap arises between hatracks of uniform length and a monument. This gap can be compensated for by means of a hatrack of different length, for example from a modular kit of hatracks of different lengths, or by a hatrack with variable length. A hatrack whose extension in longitudinal direction of the transportation means is adjustable, or a hatrack of variable length, can be a hatrack comprising two elements that are telescopically slidable into one another.

According to one embodiment an OLED can be affixed to a hatrack. For example, in the case of an overhead rack, an OLED can be used to illuminate the passenger seats underneath it. According to one embodiment an OLED can be affixed to each of the elements of a telescope hatrack. When the elements are slid together, the OLEDs intersect or overlap. One OLED disappears behind the other OLED. In this way an arrangement can be achieved in which on the telescopic hatrack essentially continuous illumination from one end of the hatrack to the other end is provided. According to one embodiment a continuous flexible OLED can be affixed to a telescopic hatrack. When the two elements of the hatrack are slid together, the continuous flexible OLED can either be folded up or rolled in. In this manner the continuous OLED can be shortened or lengthened in such a manner that it extends from one end of the telescopic hatrack to the other end.

According to one embodiment the mounting system comprises a monument and a hatrack which are connectable to the same attachment structure of the cabin or to the cabin, and/or which are connectable to the same transportation-means connection ends.

According to one embodiment the mounting system comprises a compensating element that is suitable at least in part to fill in a void arising between the monument and a lateral lining of the transportation means. For example, the monument can be positioned so as not to be directly adjacent to the lateral lining of the transportation means, because the lateral lining is curved or because there is a window opening in the lateral lining, which window opening is not to be entirely covered by the monument. A compensating element can then reduce the arising void, in order to in this manner, for example, prevent dirt or objects from falling behind the monument.

According to one embodiment the mounting system comprises a ceiling lining for a cabin of the transportation means. The ceiling lining is connectable to the cabin by way of first attachment elements. The monument is connectable to the cabin by way of second attachment elements. In order to facilitate the installation and deinstallation of monuments, the ceiling lining is affixed separately from the monuments in the cabin. The ceiling lining and the monument are not directly interconnected. The monuments can be installed and deinstalled without the need for the ceiling lining to be removed.

According to one embodiment the monument delimits the cabin between a floor of the cabin and the ceiling lining. Because the monument essentially fills in the space between the floor of the cabin and the ceiling lining no gaps arise through which the wall construction of the cabin is visible, and which gaps need to be covered by separate faceplates or lining elements.

According to one embodiment the mounting system comprises a lateral lining for the cabin of the transportation means, wherein the lateral lining can delimit the cabin between the floor of the cabin and the ceiling lining, wherein the monument and the lateral lining can be affixed to identical attachment positions in the cabin of the transportation means. The lateral lining and the ceiling lining are not directly interconnected.

In order to facilitate reconfiguration of the transportation means, the mounting system comprises lateral linings that can easily be exchanged for the monument. When the lateral lining and the monument are to completely cover the wall section of the cabin between the floor and the ceiling lining, the height of the monument and of the lateral lining is identical.

A transportation means is also provided, in particular to an aircraft or an airplane, with a monument according to the described embodiments or with a mounting system according to the described embodiments.

A hatrack is also provided that according to one embodiment can be attached to an attachment rail for a monument. According to one embodiment the hatrack comprises a hatrack-connection end for connecting the hatrack to at least one on-board system of the transportation means. The aforesaid can be connected to a transportation-means connection end that is also suitable for connection to a monument-connection end. According to one embodiment the extension of the hatrack in longitudinal direction of the transportation means is adjustable. According to one embodiment the hatrack comprises two elements that are telescopically slidable into one another.

BRIEF DESCRIPTION OF THE DRAWINGS

The present invention will hereinafter be described in conjunction with the following drawing figures, wherein like numerals denote like elements.

FIG. 6 shows a perspective view of an aircraft cabin with a monument according to one exemplary embodiment, which monument can be connected to an attachment rail for a hatrack;

FIG. 12 shows an aircraft with a monument according to one exemplary embodiment.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
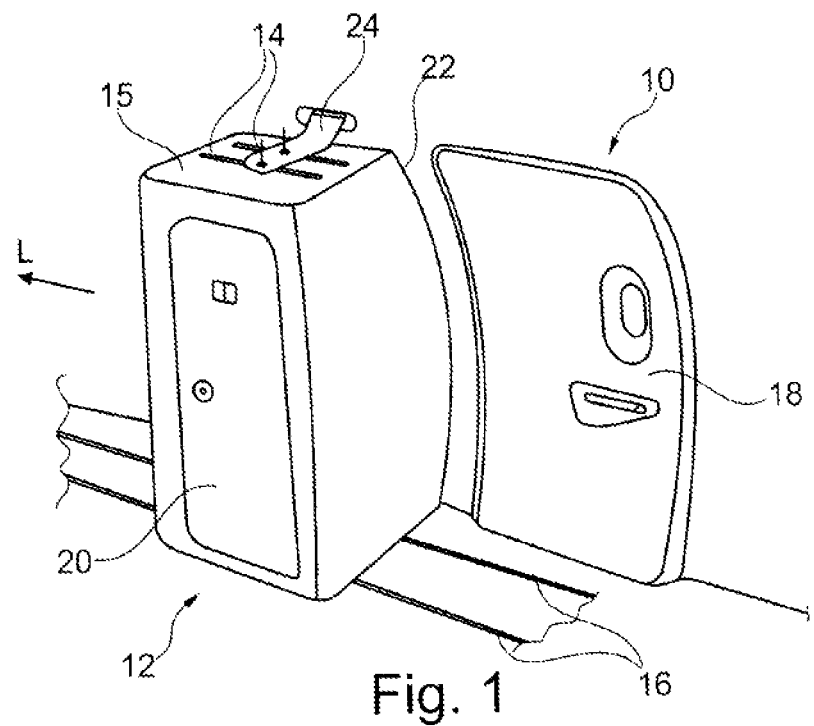
FIG. 1 shows a perspective view of an aircraft cabin with a lavatory monument according to one exemplary embodiment with two flexible attachment elements at the top.

FIG. 1 shows a perspective view of a section from the interior of a cabin 10 of an aircraft. A monument 12 is attached to two upper attachment rails 14 as attachment elements and to two seat rails 16 with further attachment elements beside a door 18 in the cabin 10. The seat rails 16 are installed in the floor 17 of the cabin 10 and are connected to the fuselage of the aircraft.

The monument 12 is a lavatory monument that can be entered by a door 20, with the rear wall 22 of said monument 12 being adapted to the curvature of the cabin wall in such a manner that no void arises behind it. In the rails 14 at the top 15 of the monument 12 there are clamps that are, for example, screwed down by means of screws to a supporting element 24 that is rigidly connected to the carrier structure of the aircraft. The attachment rails 14 form a flexible attachment element for the monument 12, because the attachment point of the monument 12 is variable or flexible as a result of sliding the clamps.

The monument 12 can be attached to the cabin 10 in a region of relative positions in longitudinal direction L of the aircraft. The region is delimited by the length of the rails 14. If the monument 12 is, for example, to be attached to the cabin so as to be offset to the relative position shown, it is then only necessary to undo the screws that connect the monument to the seat rails 16 and to the carrier element 24, then to slide the monument 12 to the new position, and subsequently to again screw the monument 12 to the seat rails 16 and to the carrier element 24.

Figure 2:
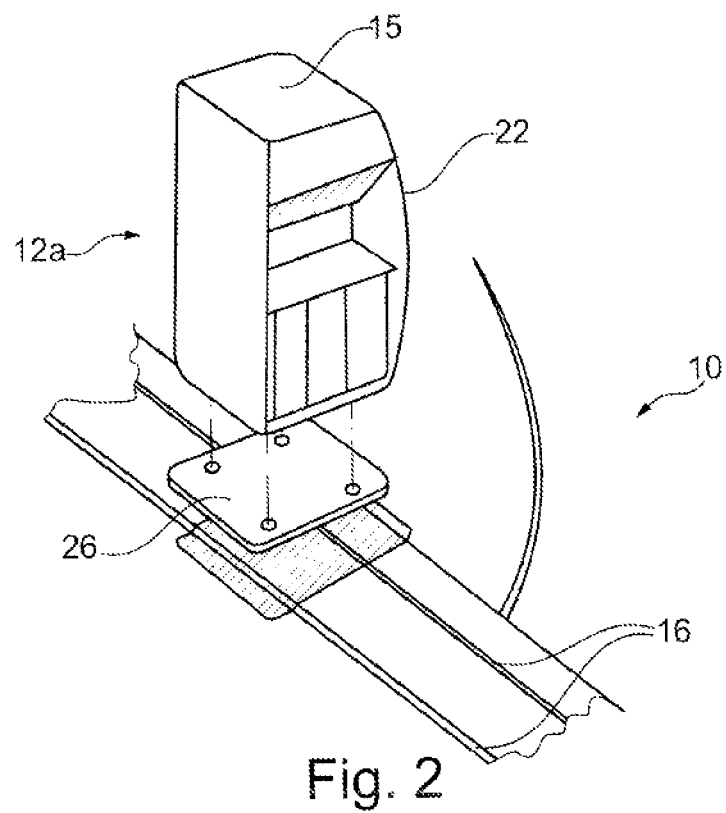
FIG. 2 shows a perspective view of an aircraft cabin with a kitchen monument according to one exemplary embodiment, which kitchen monument can be attached to a base plate.

FIG. 2 shows a further embodiment of a monument 12a that is connected to the seat rails 16 by way of a base plate 26. At its top 15 the monument 12a can be connected to the cabin in precisely the same manner as is the case with monument 12 from FIG. 1. As a result of the base plate 26 the monument 12a can be screwed to the seat rails 16 at any desired position within the cabin. The base plate 26 distributes the weight of the monument 12a in such a manner that there is no need to provide a separate support structure for the monument 12a in the floor 17 of the cabin 10 apart from the support structure for the floor 17.

Figure 3A:
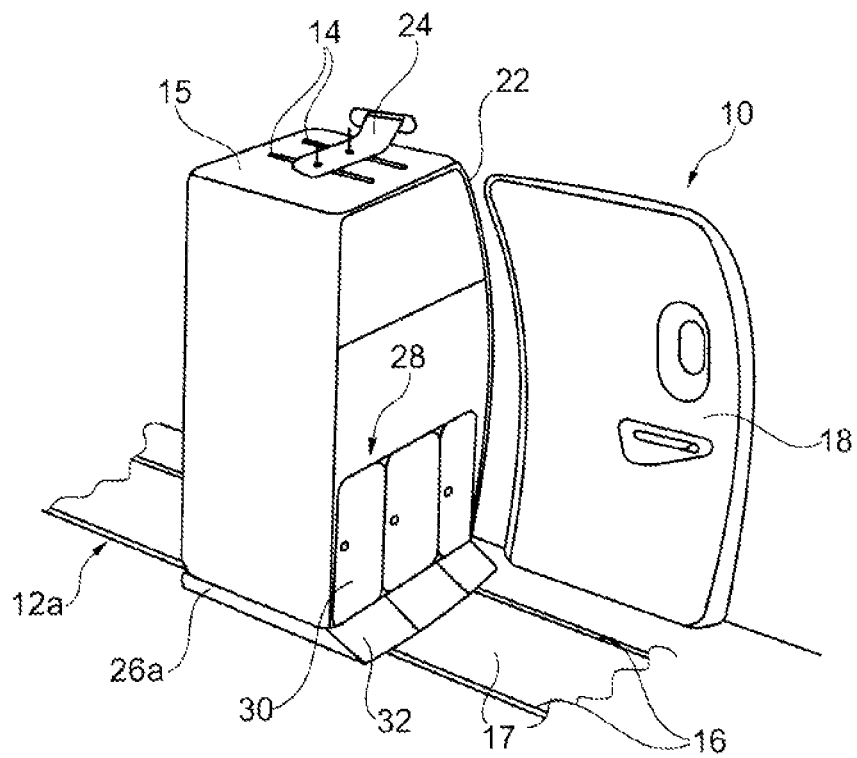
FIG. 3a shows a perspective view of an aircraft cabin with a kitchen monument with a base plate according to one exemplary embodiment.

FIG. 3a shows the monument 12a from FIG. 2 with an alternative embodiment of a base plate 26a, which monument can, for example, be a kitchen monument, in other words a galley. In the monument 12a there are three accommodation regions 28, in each case for one trolley 30. By way of a wedge-shaped section 32 of the base plate 26a it is possible to drive the trolleys 30 into and out of the accommodation regions 28.

Figure 3B:
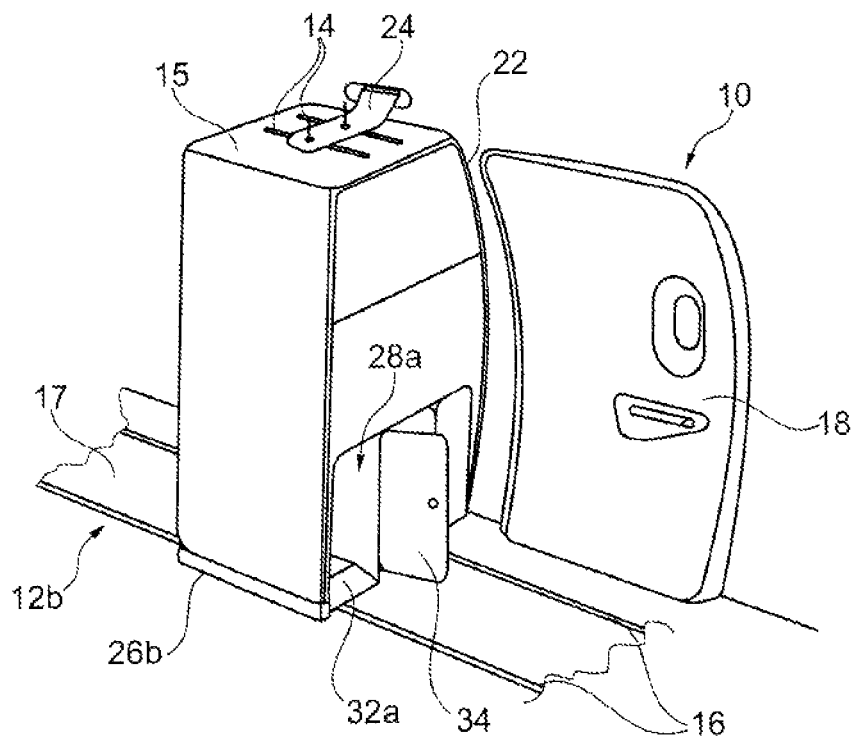
FIG. 3b shows a perspective view of an aircraft cabin with a kitchen monument with a base plate according to one exemplary embodiment.

FIG. 3b shows a further embodiment of a monument 12b with an integrated base plate 26b. The base plate 26b at the same time provides the floor of the accommodation device 28a. The accommodation device 28a comprises a door 34, shown in its open state, so that the interior of the accommodation device 28a is visible. In contrast to the embodiment of FIG. 3a, the wedge-shaped section 32a, which serves as a ramp, of the base plate 26b is arranged within the accommodation device 28a. The base plate 26b comprises a base area that is identical to that of monument 12b. In the embodiment shown in FIG. 3a of the base plate 26a the wedge-shaped section 32 projects beyond the base area of the monument 12a. The base plate 26a is thus larger than the base area of the monument 12a.

Figure 4A:
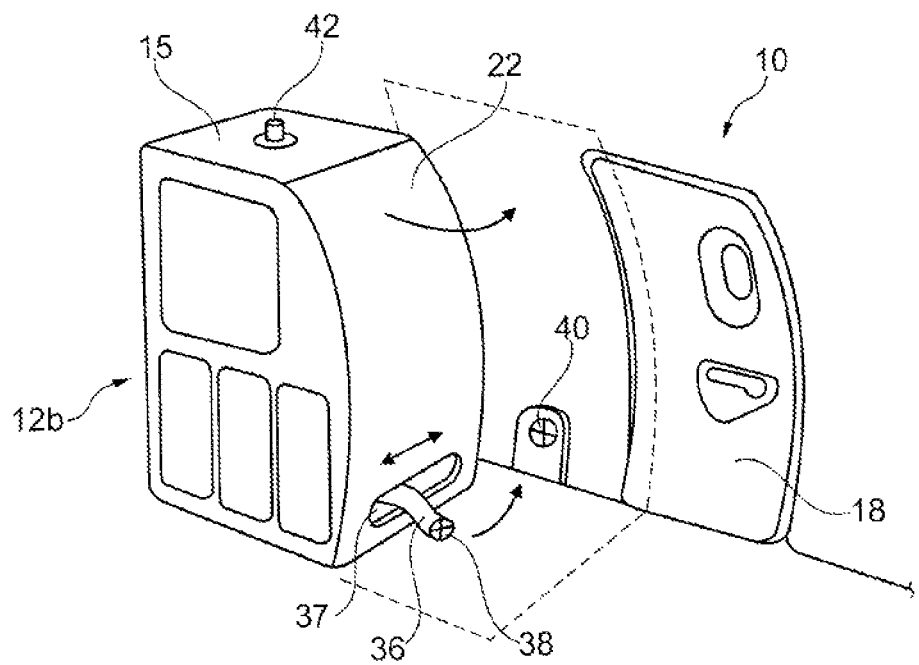
FIG. 4a shows a perspective view of an aircraft cabin with a monument according to one exemplary embodiment, which monument comprises a supply connection with a movable connection end.

FIG. 4a shows a further embodiment of a monument 12b with a supply connection 36, whose connection end 38 is movable relative to the monument. In the presently shown embodiment of the monument 12b the connection end 38 is movable in horizontal direction. For example, the supply connection 36 comprises several hoses that are movably arranged in the interior of the monument in such a manner that the connection end 38 can be moved along the opening 37. The connection end 38 is connectable, by way of a connection end 40, to an on-board system or to several on-board systems of the aircraft. The monument 12b could be a kitchen monument that is supplied with hot water and cold water by way of the supply connection 36, in which kitchen monument gray water can be fed back to the waste water system of the aircraft by way of the supply connection 36. At its top, the monument 12b shown in FIG. 4a comprises an attachment element 42. The monument can be connected to the aircraft by means of the seat rails 16 in precisely the same manner as is the case with one of the preceding monuments.

Figure 4B:
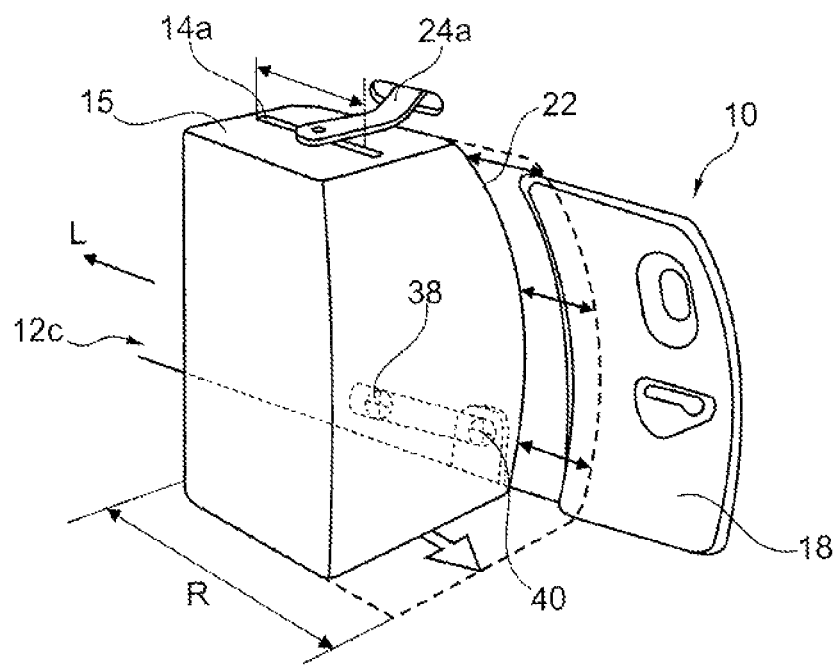
FIG. 4b shows a perspective view of an aircraft cabin with a monument according to one exemplary embodiment with a flexible attachment element at the top and a supply connection with a movable connection end.

FIG. 4b shows a further embodiment of a monument 12c with a single attachment rail 14a at its top 15. The attachment rail 14a can, for example, be attached, by means of a clamp situated in it, to a carrier element 24a that is rigidly connected to the fuselage of the aircraft. The monument 12c further comprises a supply connection with a connection end 38 that can be moved in horizontal direction relative to the monument and that can be connected, by means of one connection end 40, to at least one on-board system of the aircraft.

FIG. 4b shows that the monument 12c can be attached to a region of relative positions R within the cabin 10. To this effect it is only necessary to undo the clamps in the rail 14a and attachment elements (not shown) with the floor, for example with seat rails. With the attachment elements undone, the monument 12c can be slid within the region R. The region R is delimited by the length of the attachment rail 14a and the possible movement region of the connection end 38. Although the connection end 40 of the aircraft is arranged at a fixed position within the cabin, it is not necessary to install lines or pipes to the monument 12c, because the connection end 38 can be displaced relative to the monument 12c. The monument 12c can be displaced from the middle position shown up to 30 cm in the direction L of the longitudinal axis of the aircraft without this necessitating an extension from the connection end 40 to the end 38 that is movable.

Figure 5:
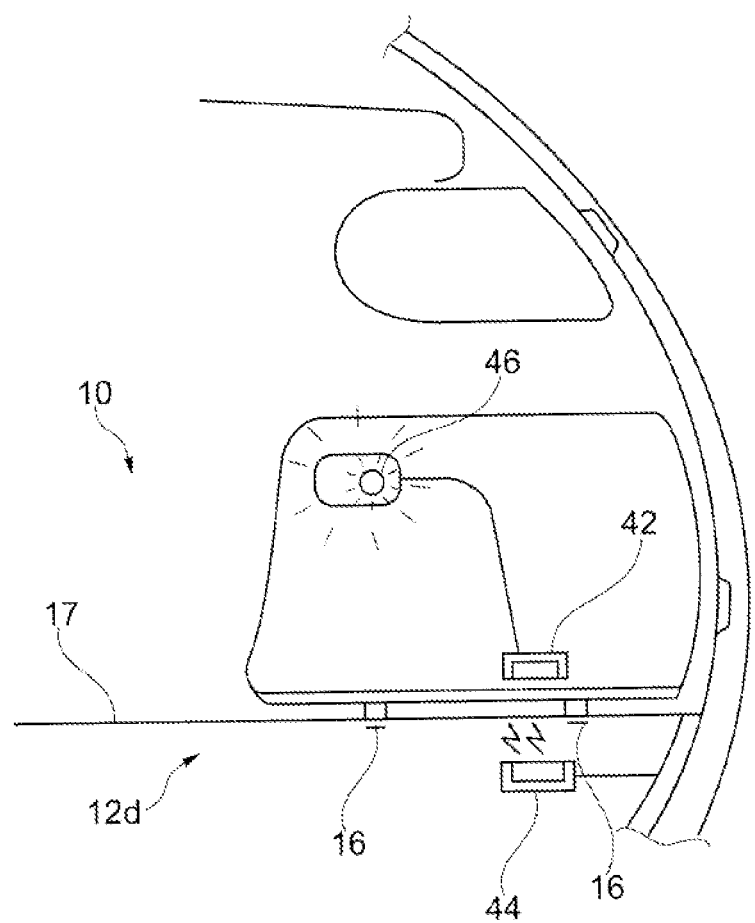
FIG. 5 shows a cross section of an aircraft cabin with a monument according to one exemplary embodiment, whose power supply is effected by way of an induction loop.

FIG. 5 diagrammatically shows the manner in which an embodiment of a monument 12d can be supplied with power by means of induction loops 42, 44. Underneath the floor 17 of the cabin 10 a first induction loop 44 is arranged which is connected to the power supply system of the aircraft. Within the monument 12d there is a second induction loop 42 in which, by means of the induction principle, power is induced through the first induction loop 44, which power can be fed to a consumer 46, for example to a lamp.

FIG. 6 shows a further embodiment of a monument 12e, which on the one hand is attached to the floor of the cabin 10 by means of the seat rails 16, and on the other hand comprises attachment elements 50 that can be attached to an attachment rail 48 for a hatrack. In this arrangement the attachment elements 50 can be attached in elongated openings 51 of the attachment rail 48.

Figure 7A:
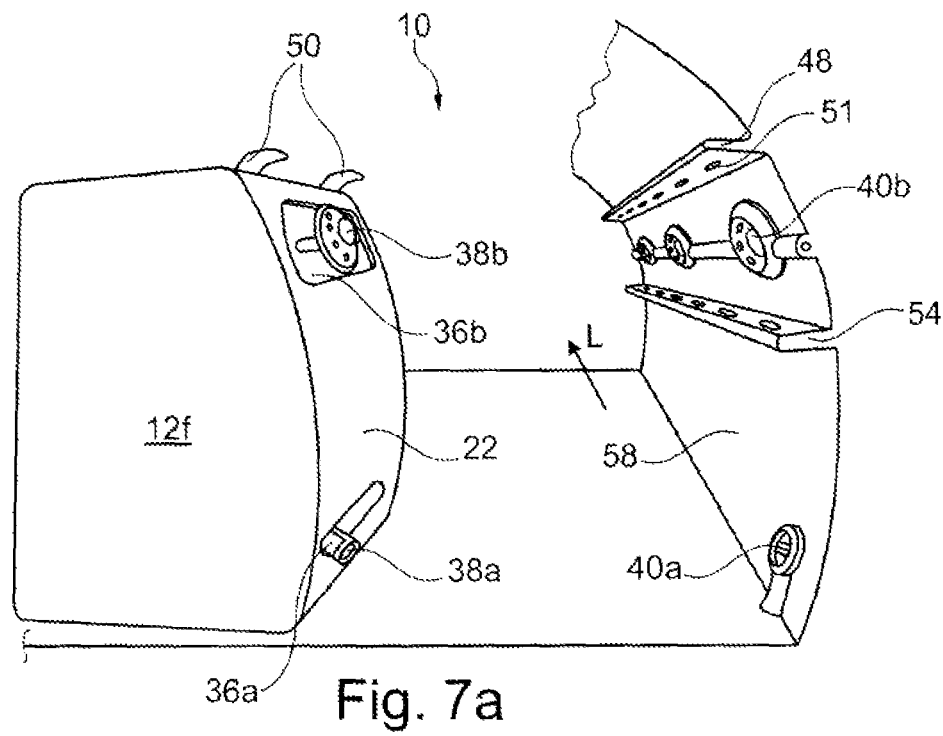
FIG. 7a shows a perspective view of an aircraft cabin with a monument according to one exemplary embodiment, which monument can be connected to a transportation-means connection end that is also suitable for connection to a hatrack-connection end.

FIG. 7a shows a further embodiment of a monument 12f that comprises attachment elements 50, a first supply connection 36a and a second supply connection 36b. The attachment elements 50 are connectable to an attachment rail 48 for hatracks. The first supply connection 36a comprises a connection end 38a that is connectable to a connection end 40a of the aircraft. The supply connection 36a could, for example, be several pipes or hoses by means of which service water can be supplied to the monument 12f and by means of which gray water or black water generated in the monument 12f can be fed back to the aircraft.

The second supply connection 36b comprises a connection end 38b that by way of a connection end 40b of the aircraft can be connected to further on-board systems. For example, the power supply of the monument 12f and a data network connection could be integrated in the supply connection 36b. The connection ends 36a and 36b are movable in horizontal direction relative to the monument 12f. If the monument 12f is to be connected to the cabin 10, the monument 12f is first pushed approximately to its target position. Subsequently, the connection ends 38a and 38b are connected to the corresponding connection ends 40a and 40b. Thereafter, the monument 12f can be displaced precisely to its target position, wherein the connection ends 38a and 38b of the monument 12f, which connection ends 38a and 38b are then firmly connected to the connection ends 40a and 40b, move relative to the monument 12f. Finally, the attachment elements 50 are connected to the attachment rail 48, for example in that they are screwed, by means of screws, to the attachment rail 48 through the elongated openings 51.

Figure 7B:
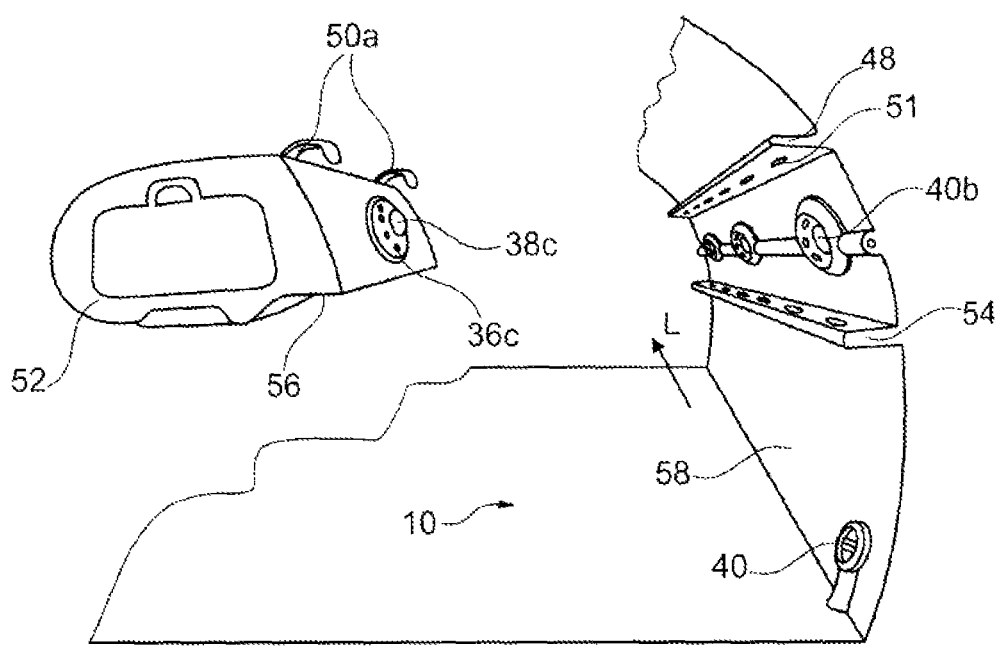
FIG. 7b shows a perspective view of an aircraft cabin with a hatrack that comprises a connection end that can be connected to the same transportation-means connection end for a mounting system according to one exemplary embodiment.

FIG. 7b shows an embodiment of a hatrack 52 in the form of a baggage rack. The hatrack 52 comprises a supply connection 36c with a connection end 38c that is rigidly connected to the hatrack 52. By means of the hook-shaped attachment elements 50a the hatrack 52 can be hooked into the elongated openings 51 in the attachment rail 48. In this manner concurrently in one process step the connection end 38c can be connected to the connection end 40b. In its attached position the hatrack 52 is supported by its rear section 56 on the attachment rail 54.

As shown in FIG. 7a and FIG. 7b, a multitude of connection ends 40b are affixed in the sidewall 58 of the cabin 10. As a rule, for each hatrack 52 a connection end 40b is provided. The connection ends 40b are arranged equidistantly spaced apart from one another in the direction of the longitudinal direction L of the aircraft. The connection ends 40b comprise a spacing that is determined by the length of sequentially arranged hatracks 52. Although the position of the hatracks 52 is determined by the position of the connection ends 40b, the position of the monument 12f relative to a longitudinal direction L of the aircraft can be selected at will if the horizontal movability of the connection ends 36a and 36b is greater than the distance of the connection ends 40b. FIG. 7a and FIG. 7b show a mounting system for an aircraft, which mounting system comprises one or several of the monuments 12f and of one or several of the hatracks 52.

Figure 8A:
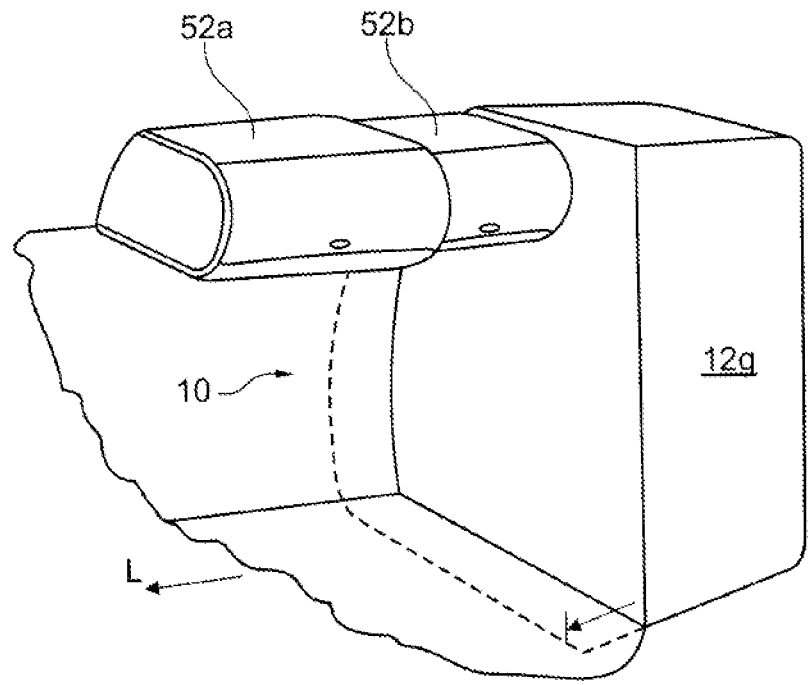
FIG. 8a shows a perspective view of an aircraft cabin with two hatracks of different lengths for a mounting system according to one exemplary embodiment.

FIG. 8a shows a further mounting system for an aircraft, which mounting system comprises the monument 12g and two hatracks 52a and 52b. The monument 12g can be attached to the cabin 10 and connected to the on-board system of the aircraft in the same manner as one of the monuments 12a to 12f. Likewise, the hatracks 52a and 52b can be attached to the cabin in the same manner as the hatrack 52, namely by means of an attachment rail 48, and can comprise a supply connection 36c. The hatracks 52a and 52b are different in length in the direction L of the longitudinal axis of the aircraft. In this way, when the monument 12g is arranged at a distance from the hatrack 52a, which distance is shorter than the length of the hatrack 52a, it is possible to prevent a gap from arising. For closing gaps of different lengths, hatracks 52b of different lengths are provided.

Figure 8B:
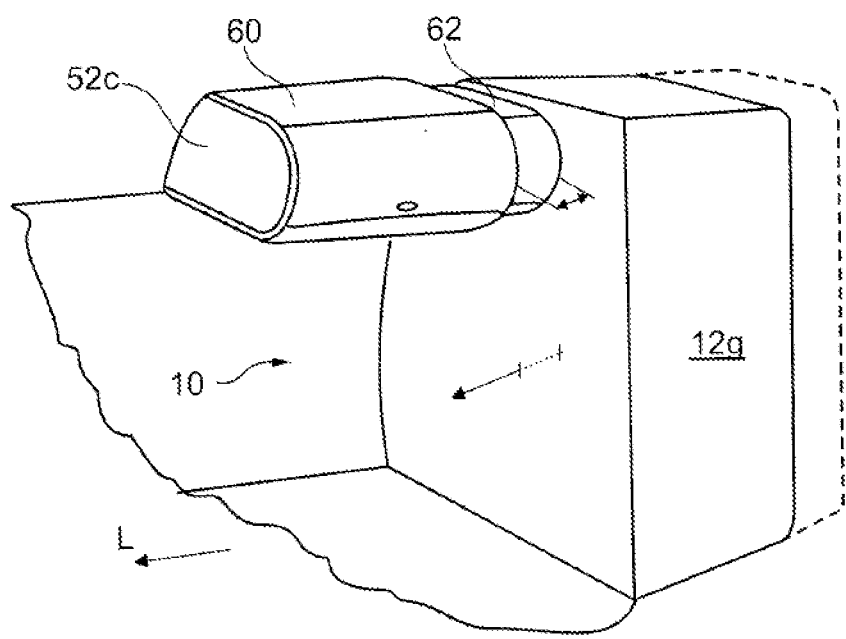
FIG. 8b shows a perspective view of an aircraft cabin with a hatrack that is telescopically slidable, for a mounting system according to one exemplary embodiment.

FIG. 8b shows a hatrack 52c that comprises two elements 60 and 62 that are telescopically slidable into one another. If instead of hatrack 52a a hatrack 52c is used, a gap that would arise between the hatrack 52a and the monument 12g can be closed in that the element 62 is pulled out of the element 60. This can, for example, take place automatically by means of pneumatic springs.

Figure 9A:
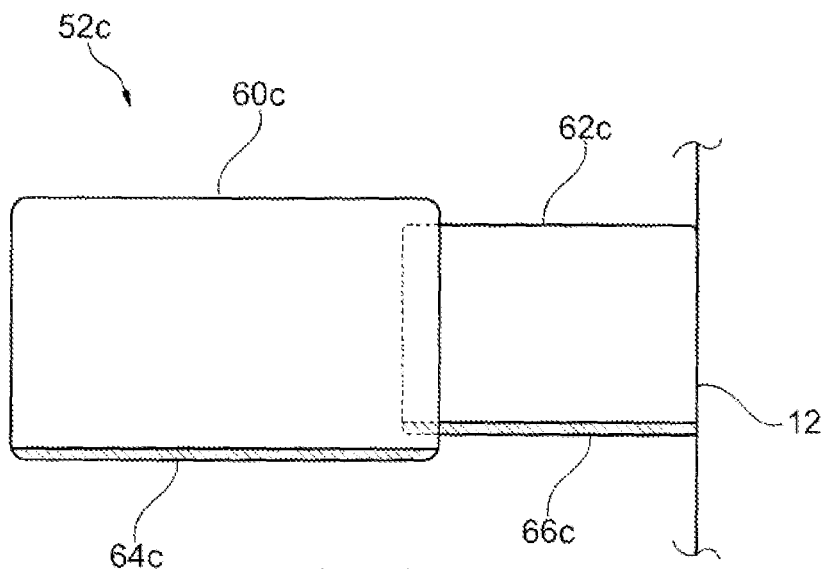
FIG. 9a and FIG. 9b show a longitudinal section of a hatrack that is telescopically slidable, for a mounting system according to one exemplary embodiment.
Figure 9B:
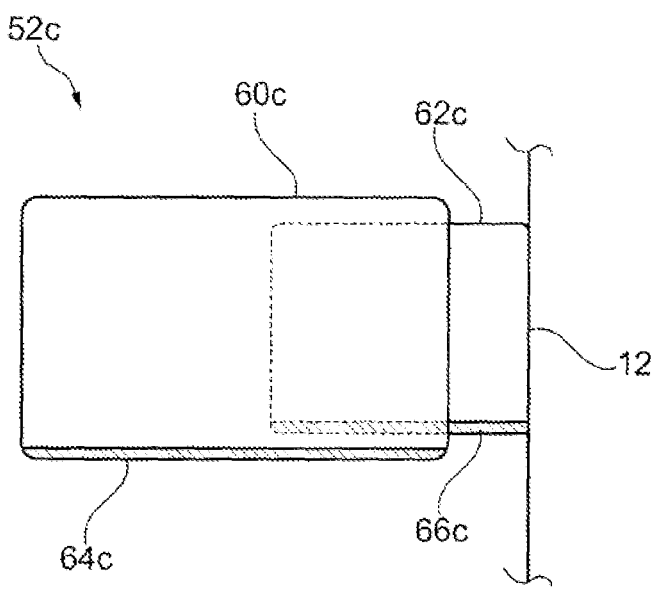

FIG. 9a shows a cross section of the hatrack 52c that comprises the two elements 60c and 62c. The element 62c can be pushed into the element 60c. On the two elements 60c and 62c, which are telescopically slidable into one another, at their bottom in each case an OLED 64c, 66c is attached. The element 62c can on one side rest against a monument 12. FIG. 9b shows the hatrack 52c in which the elements are slid further into one another than is the case in FIG. 9a. In this arrangement the OLED 66c is partly pushed into the interior of the element 64c. The OLEDs 64c and 66c overlap one another.

Figure 9C:
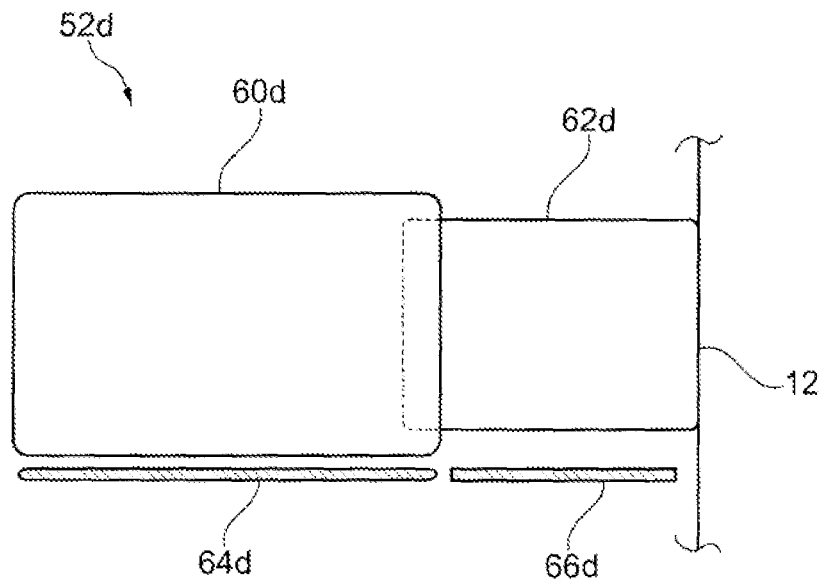
FIG. 9c and FIG. 9d show a longitudinal section of a hatrack that is telescopically slidable, for a mounting system according to one exemplary embodiment.
Figure 9D:
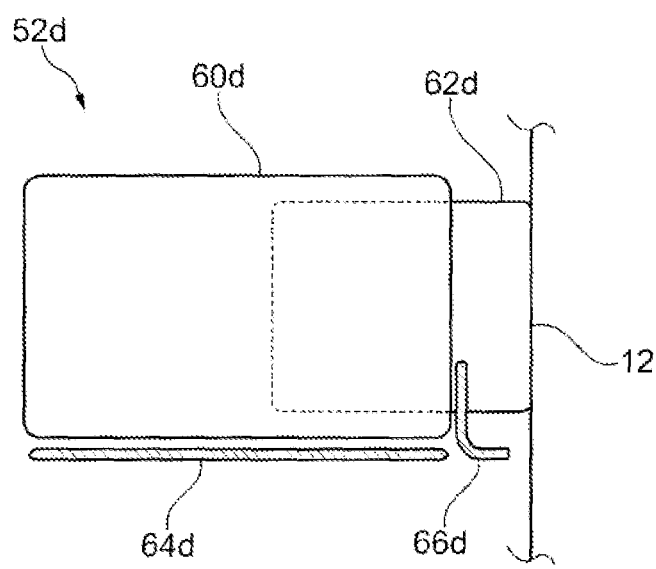

FIG. 9c and FIG. 9d show a telescopically slidable hatrack 52d that essentially comprises the same design as the hatrack from FIGS. 9a and 9b. The OLED 66d has been affixed so as to be flush with the OLED 64d, in other words at the same height as the aforesaid. During pushing together the OLED 66d folds and moves parallel to the lateral area 61d of the element 60d into the element 62d.

Figure 9E:
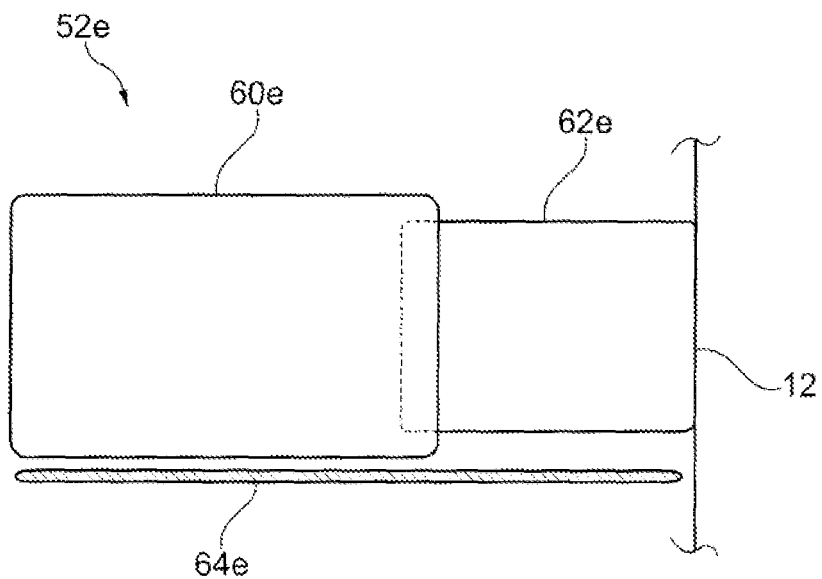
FIG. 9e and FIG. 9f show a longitudinal section of a hatrack that is telescopically slidable, for a mounting system according to one exemplary embodiment.
Figure 9F:
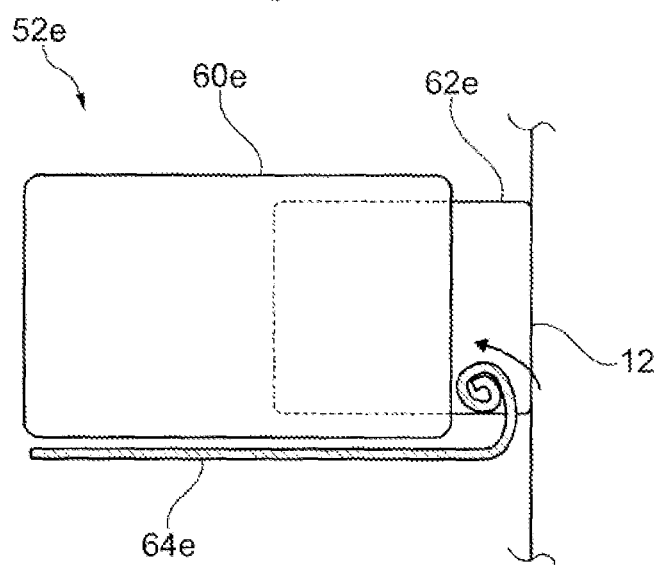

FIG. 9e and FIG. 9f show a telescopically slidable hatrack 52e that essentially comprises the same design as the hatracks from FIG. 9a to FIG. 9d. In contrast to the hatracks from FIG. 9a to FIG. 9d the hatrack 52 comprises a single OLED 64e that is affixed to the element 60e. When the elements 60e and 62e are pushed together the OLED 64e is rolled into the interior of the element 62e.

Figure 10:
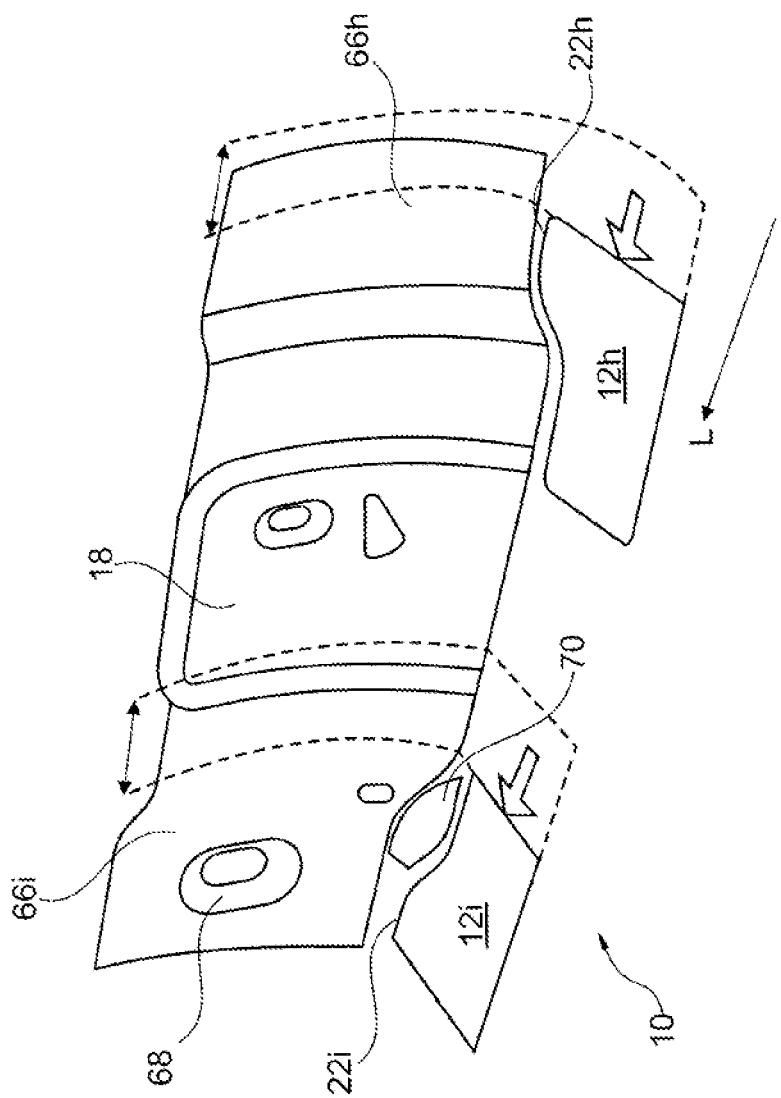
FIG. 10 shows a perspective view of an aircraft cabin with a monument and a compensating element for a mounting system according to one exemplary embodiment.

FIG. 10 shows a section of a cabin 10 of an aircraft. In the cabin 10 there are two monuments 12h and 12i of which only the base area is shown. The monuments 12h and 12i can be connected to the cabin and/or to the on-board systems of the aircraft in exactly the same manner as one of the monuments 12a to 12f. The monument 12h comprises a rear wall 22h that is curved in such a manner that between the rear wall 22h and the lateral lining 66h in the arrangement position of the monument 12h as shown in FIG. 10 no large void arises between the rear wall 22h of the monument 12h and the lateral lining 66h of the cabin 10 for the aircraft. If the monument 12h is displaced against the arrow L denoting the longitudinal direction of the aircraft, a void exists between the monument 12h and the lateral lining 66h, which void is not visible from the outside.

The monument 12i also comprises a rear wall 22i that is curved in such a manner that in a particular position of the monument 12i between the rear wall 22i and the sidewall 66i essentially no cavity arises. In the position shown in FIG. 10 the monument 12i is, however, arranged in such a manner that a window 68 in the sidewall 66i is not covered up by the monument 12i. Therefore a void arises between the monument 12i and the lateral lining 66i. This void can be closed up to the window 68 by means of a compensating element 70. Likewise, FIG. 10 only shows the base area of the compensating element 70.

Figure 11A:
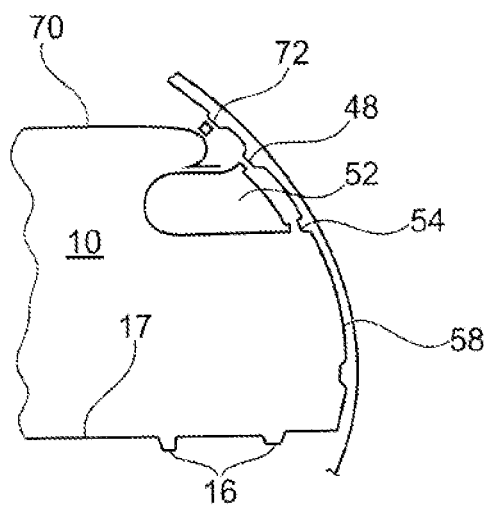
FIG. 11a shows a cross section of an aircraft cabin with a mounting system according to one exemplary embodiment, comprising a ceiling lining and a hatrack.

FIG. 11a shows a cross section of a cabin 10 of an aircraft. The cabin is delimited from the bottom by a floor 17 in which seat rails 16 are attached. The cabin 10 is laterally delimited by a sidewall 58 that comprises attachment rails 48, 54 to which a hatrack 52 is attached, approximately in the same manner as shown in FIG. 7b. At the top the cabin 10 is delimited by a ceiling lining 70 which is connected to the sidewall 58 of the cabin by way of dedicated attachment elements 72. The hatrack 52 can be taken off the wall 58 without there being a need to remove the ceiling lining 70.

Figure 11B:
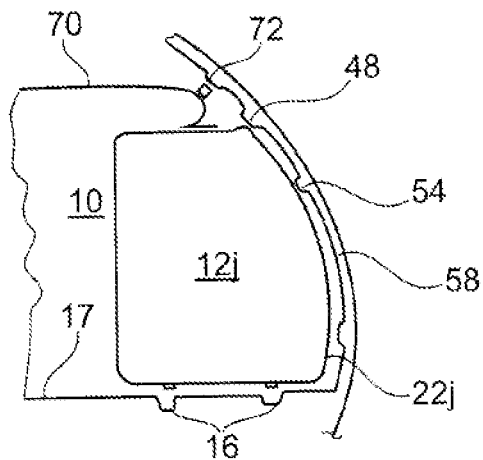
FIG. 11b shows a cross section of an aircraft cabin with a mounting system according to one exemplary embodiment, comprising a ceiling lining and a monument.

FIG. 11b shows a cross section of a cabin 10 of an aircraft, which cross section is analogous to that shown in FIG. 11a. Instead of the hatrack 52 a monument 12j is connected to the cabin 10. This could take place, as shown in the preceding figures, by means of the attachment rail 48 and the seat rails 16. The monument 12j can be affixed to the cabin without there being a need to undo the ceiling lining 70, because the monument 12j and the ceiling lining 70 comprise their own, separate, attachment rails 48, 72 to the wall 58. In addition, the monument 12j fills the space between the floor 17 and the ceiling lining 70 so that no larger gaps arise through which the wall 58 of the cabin 10 would be visible. In this manner further lining elements are avoided.

Figure 11C:
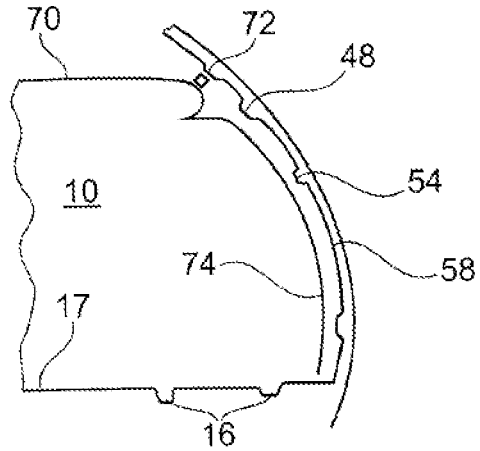
FIG. 11c shows a cross section of an aircraft cabin with a mounting system according to one exemplary embodiment, comprising a ceiling lining and a lateral lining.

FIG. 11c shows a cross section of a cabin 10 of an aircraft analogous to the cross sections shown in FIGS. 11a and 11b. Instead of the monument 12j a lateral lining 74 is connected to the wall 58 of the cabin 10. This could, for example, as indicated in FIG. 11, take place by way of the attachment rail 54 or by way of the attachment rail 48. As is the case with the monument 12j, the lateral lining 74 extends from the floor 17 of the cabin 10 to the ceiling lining 70. The mounting system shown in FIG. 11a to FIG. 11c makes it possible to exchange hatracks 52, monuments 12j and lateral linings 74 at will, without there being a need to remove the ceiling lining 70.

FIG. 12 shows a diagrammatic top view of an aircraft 100 with several monuments that are attached in a cabin 110.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A mounting system for installation in a transportation having a cabin, comprising:
    a monument;
    a supply connection configured to connect the monument to an on-board system of the transportation the supply connection comprising a monument-connection end that is configured to connect to a transportation connection end of the on-board system;
    a lower flexible attachment element configured to attach the monument to the cabin and further configured to connect to a seat rail of the transportation, the flexible attachment element further configured such that attachment of the monument is available in a region of relative positions of the monument relative to the cabin;
    an upper attachment element for attachment to an attachment rail for a hatrack;
    an opening in the monument;
    a plurality of attachment elements configured to attach the monument to a floor of the cabin;
    a load-distributing substructure including a base plate configured to distribute forces that are exerted by the monument on the plurality of attachment elements and the floor; and
    a hatrack comprising two exterior enclosures that are telescopically slidable into one another and an OLED arrangement coupled to the hatrack to provide continuous illumination from a first end of the hatrack to a second end of the hatrack,
    wherein the monument-connection end is movable relative to the monument with a movement along the opening of the monument.

2. The mounting system of claim 1, further comprising:
    a first hatrack having first extensions in a first longitudinal direction of the transportation; and
    a second hatrack having a second extension in a second longitudinal direction of the transportation that differs from the first extensions in the first longitudinal direction.

3. The mounting system of claim 1, further comprising a compensating element that is suitable at least in part to fill in a void arising between the monument and a lateral lining of the transportation.

4. The mounting system of claim 1, further comprising:
    a ceiling lining for the cabin;
    first attachment elements configured to connect the ceiling lining to the cabin; and
    second attachment elements configured to connect the monument to the cabin,
    wherein the monument is configured to delimit the cabin between the floor of the cabin and the ceiling lining.

5. The mounting system of claim 4, further comprising:
    a lateral lining for the cabin that is configured to delimit the cabin between the floor of the cabin and the ceiling lining,
    wherein the monument and the lateral lining can be affixed to substantially identical attachment positions on the transportation.

6. A transportation, comprising:
    a cabin; and
    a monument for the cabin, the monument comprising:
        a supply connection configured to connect the monument to an on-board system of the transportation the supply connection comprising a monument-connection end that is configured to connect to a transportation connection end of the on-board system;
        a lower flexible attachment element configured to attach the monument to the cabin and further configured to connect to a seat rail of the transportation, the flexible attachment element is further configured such that attachment of the monument is available in a region of relative positions of the monument relative to the cabin;
        an upper attachment element for attachment to an attachment rail for a hatrack;
        an opening in the monument;
        a plurality of attachment elements configured to attach the monument to a floor of the cabin;

a load-distributing substructure including a base plate configured to distribute forces that are exerted by the monument on the plurality of attachment elements and the floor; and a hatrack comprising two exterior enclosures that are telescopically slidable into one another and an OLED arrangement providing continuous illumination from a first end of the hatrack to a second end of the hatrack, wherein the monument-connection end is movable relative to the monument with a movement along the opening of the monument.

7. The transportation of claim 6, wherein the transportation is an airplane.

8. The transportation of claim 6, wherein the transportation is an aircraft.

9. The transportation of claim 6, wherein the OLED arrangement comprises a first OLED coupled to a first one of the two elements and a second OLED coupled to a second one of the two elements of the hatrack.

\* \* \* \* \*